United States Patent [19]

Westermeier

[11] 4,120,469
[45] Oct. 17, 1978

[54] IN-LINE ACTUATOR MONITORING AND CONTROL APPARATUS

[75] Inventor: Theodore F. Westermeier, St. Charles, Mo.

[73] Assignee: The United States of America as represented by the Secretary of the Air Force, Washington, D.C.

[21] Appl. No.: 776,391

[22] Filed: Mar. 10, 1977

[51] Int. Cl.² .............................................. G05D 1/00
[52] U.S. Cl. ................................ 244/194; 91/363 A; 318/564
[58] Field of Search ................. 244/194; 235/153 AE; 340/146.1 BE; 318/564; 307/204, 219; 91/363 A

[56] References Cited

U.S. PATENT DOCUMENTS

| | | | |
|---|---|---|---|
| 3,438,306 | 4/1969 | Kazmarek | 244/194 |
| 3,505,929 | 4/1970 | Coppola | 244/194 |
| 3,509,435 | 4/1970 | Howells | 318/564 |
| 3,741,073 | 6/1973 | Garnjost | 91/363 A |

Primary Examiner—Trygve M. Blix
Assistant Examiner—Reinhard J. Eisenzopf
Attorney, Agent, or Firm—Joseph E. Rusz; William Stepanishen

[57] ABSTRACT

An in-line actuator monitoring apparatus utilized in a redundant actuator system for determining which of the two redundant secondary actuators in a flight control system has failed and providing a disable signal to the failed actuator unit.

5 Claims, 2 Drawing Figures

IN-LINE ACTUATOR MONITORING AND CONTROL APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a redundant flight control system, and in particular to an in-line actuator monitoring and control apparatus.

In the prior art, it is well known in the field of aircraft control that hydraulic powered systems are generally utilized to position or activate various controlled surfaces. Usually the controlled system is operated by input command signals from the pilot to maintain a particular course, attitude, altitude, etc. However, as the size and speed of modern aircraft increased, so did the requirement that probability of failure in these hydraulic systems be minimized. Thus, it is now common in large and high speed aircraft to provide redundant control systems set with multiple control channels such that failure of one channel does not cause a failure of the entire system, and consequent loss of the aircraft. As a result of these factors, the acceptable response time for switching out one failed channel of a redundant control system is highly critical and therefore, must be minimal.

There have been numerous techniques and concepts utilized to implement redundant control systems. These systems have included standby channels with switch over from one channel to the standby channel upon failure of a single channel, multiple independent control surfaces, each with its own actuator so that failure of one surface does not result in failure of the system, displacement summing channels in which the resulting displacement of the control surface is effected by multiple actuators, each one of which is displaced some fraction of the commanded displacement, and force summed control systems in which the force imparted to the control element by each one of multiple actuators is some fraction of a commanded force. In each case it is important to detect and warn of any failure so that corrective action can be taken before initiation of a chain of events ending in catastrophy. The choice of system depends upon the overall characteristics of the systems such as the tolerable transient shift which may occur upon failure of a channel, size and weight characteristics of the system, and the acceptable probability of failure. In a redundant fly by wire flight control system, when but two channels are operative and a failure occurs in one of the two remaining control surfaces secondary actuators, a requirement exists for a means to detect and indicate which of the two actuators has failed if the system is to continue to operate properly. The present invention provides such a system.

SUMMARY

The present invention utilizes a pair of decision logic units in a flight control system having a redundant hydraulic actuator control mechanism for determining which of the mechanisms has failed and providing a signal to disable the failed actuator. The decision logic units respectively and simultaneously receive signal inputs which are representative of the actuator piston pressure, the desired actuator position, and the actual actuator position. The decision logic units process the input information, determine which unit has failed, and provides a disable signal to the proper actuator.

It is one object of the present invention, therefore, to provide an improved actuator monitoring and control apparatus having a high probability of detecting a failed actuator.

It is another object of the invention to provide an improved actuator monitoring and control apparatus for detecting and disabling a failed hydraulic actuator in a redundant control system.

It is still another object of the invention to provide an improved actuator monitoring and control apparatus wherein only the direction of intended and actual travel of the actuators are used to detect a failed actuator.

It is yet another object of the invention to provide an improved actuator monitoring and control apparatus having improved performance characteristics over known similar circuits.

These and other advantages, objects and features of the invention will become more apparent from the following description taken in conjunction with the illustrative embodiment in the accompanying drawings.

DESCRIPTION OF THE PREFERRED EMBODIMENT

Figure 1:
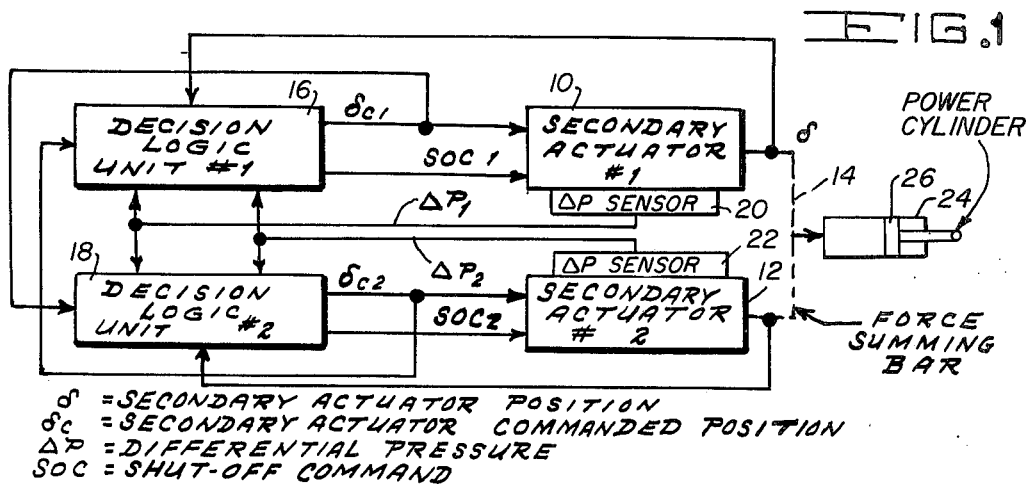
FIG. 1 is a block diagram of the in-line actuator monitoring and control apparatus in accordance with the present invention, and, FIG. 2 is a flow diagram of the algorithm for detecting which of the two actuator has failed.

Referring now to FIG. 1, there is shown an in-line hydraulic actuator monitoring and control apparatus for detecting failed units in a redundant system. However, prior to discussing FIG. 1 in detail, it must be noted that the following symbols and notations which are used in conjunction with and on FIG. 1 are defined as follows:

$\delta$ = Secondary Actuator Position
$\delta_c$ = Secondary Actuator Commanded Position
$\Delta P$ = Differential Pressure
SOC = Shut Off Command In FIG. 1, there is a first and second hydraulic secondary actuator unit 10, 12 whose outputs are coupled to the force summing bar 14. The force which is ultimately applied to the force summing bar 14 is applied to a power cylinder which comprises a sealed cylinder 24 and a piston 26 and is part of an aircraft controlled surface subsystem. A signal which is related to the output position of the actuator is applied from the secondary actuator units 10, 12 to the respective decision logic units 16, 18 that is associated with the monitoring and control of that particular actuator unit. A pressure signal from each secondary actuator unit 10, 12 is applied to each decision logic unit 16, 18.

The in-line actuator monitoring and control apparatus operates in the following manner. The secondary actuator configuration as shown, is a triplex, force summing, hydraulically powered actuator which controls surface position in response to electrical signals from the digital decision logic units 16, 18, and provides electrical information to the logic units 16, 18. The secondary actuators 10, 12 are comprised of three individual elements, which are small actuators, whose force outputs are summed through a force summing bar 14.

Each individual element is part of one of the channels. Each element has a low voltage detector to provide position feedback to its channel ($\delta$). The working pressure or differential pressure across each element's piston head is monitored by a differential pressure sensor 20, 22 which provides electrical information ($\Delta P$) to the decision logic units 16, 18. When an element is in error, it will fight the other element and its differential pressure will increase. When the differential pressure exceeds a predetermined level, the decision logic unit will indicate that the element has failed and initiates a shut down by de-energizing the element's solenoid operated shutoff valve (SOC).

Figure 2:
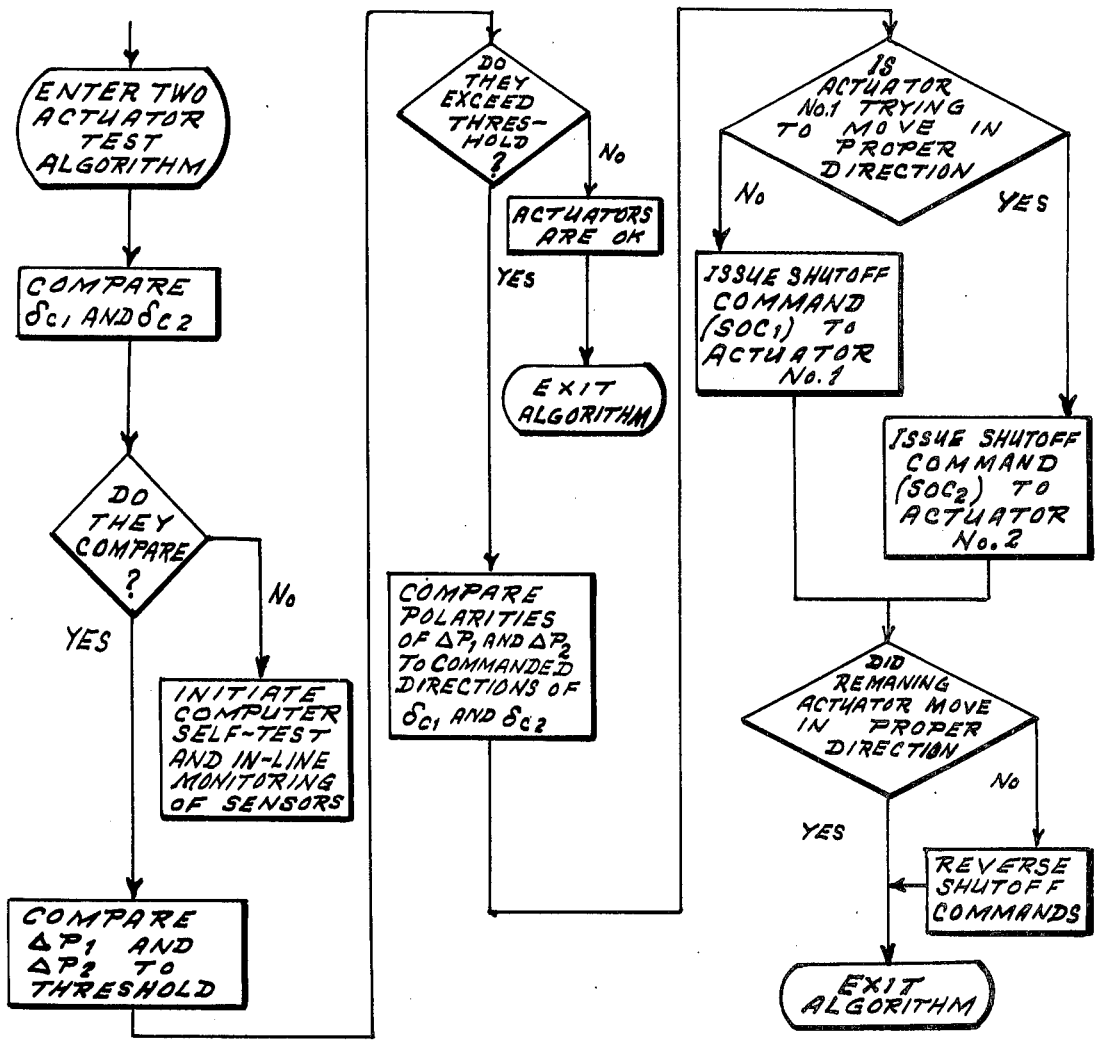

The decision logic units 16, 18 that detect which of the two actuators has failed are identical units that function according to the algorithm shown and described in FIG. 2. The algorithm has an algorithm size of 90 words and utilizes the following preconditions:

1. Two actuators remain,
2. The computers receive secondary actuator position
3. The computers receive differential pressure signals, $\Delta P_1$ and $\Delta P_2$,
4. The computers exchange actuator commands, $\delta_{c1}$ and $\delta_{c2}$.

Each decision logic unit 16, 18, according to the algorithm 90 of FIG. 2, determines and establishes the actuator position commands ($\delta_{c1}$ and $\delta_{c2}$). If the signals compare, no failures have occurred upstream of the outputs of the logic units 16, 18 and the decision logic units 16, 18 are in a condition to detect possible actuator failures. The differential pressures ($\Delta P_1$ and $\Delta P_2$) received from the actuators are then compared to a predetermined threshold value. If the threshold is not exceeded, the actuators have not failed. If the threshold is exceeded, the actuators are engaged in a force-fight, indicating that one of the actuators has failed.

The polarities of the differential pressure signals ($\Delta P_1$ and $\Delta P_2$) tell which direction (i.e., extend or retract) each actuator is trying to move. The decision logic units 16, 18 from the actual actuator position ($\delta$) and the commanded actuator positions ($\delta_{c1}$ and $\delta_{c2}$), know which direction the actuators should be trying to move. The actuator that is trying to move in the wrong direction is labelled as the failed actuator. A shut-off command (SOC) is issued to the shut-off valve of the failed actuator. The follow-up action is available by checking to see if the remaining good actuator did in fact move to the commanded position after the failed actuator was removed from operation. Thus, the in-line actuator monitoring and control apparatus has achieved its function and the functional hydraulic actuator system will remain fully operational.

Although the invention has been described with reference to a particular embodiment, it will be understood to those skilled in the art that the invention is capable of a variety of alternative embodiments within the spirit and scope of the appended claims.

What is claimed is:

1. An in line monitoring and control apparatus comprising in combination:
    first and second actuator units arranged in a redundant configuration, said first and second actuator units being hydraulically operated and controlled by electrical input signals respectively, said first and second actuator units having their respective output force applied to a force summing means, said first and second actuator units each operating on a differential pressure, said first and second actuator units each providing an actuator position signal, and
    first and second decision logic units to respectively provide control signals to said first and second actuator units, said first decision logic unit providing a first control command and a first position command to said first actuator unit, said second decision logic unit providing a second control command and a second position command to said second actuator unit, said first decision logic unit receiving a first actuator position signal from said first actuator means, said second decision logic unit receiving a second actuator position signal from said second actuator unit, said first and second decision logic units respectively compare said first and second actuator position signals with the respective first and second position command to determine an actuator unit failure, said first and second decision logic units each receive a first and second differential pressure signal from said first and second actuator units, said first and second decision units each utilizing said first and second differential pressure signal to determine an actuator unit failure, said first or second decision logic units providing a shut-off command to the failed actuator unit.

2. An in-line monitoring and control apparatus as described in claim 1 wherein said first and second actuator units respectively comprise in combination:
    a sealed cylinder with a hydraulically operated piston contained therein, said sealed cylinder having a differential pressure sensor mounted therein,
    an actuator rod connected to said piston, said actuator rod extending from said sealed cylinder and connecting with said force summing means, and
    a control valve connected between said sealed cylinder and said first and second decision logic units to control the hydraulic pressure in said sealed cylinder.

3. An in-line monitoring and control apparatus as described in claim 2 wherein said first and second decision logic units each utilize a digital format.

4. An in-line monitoring and control apparatus as described in claim 2 wherein said force summing means is a force summing bar connected to both actuator rods of said first and second actuator units.

5. An in-line monitoring and control apparatus as described in claim 2 wherein said first and second differential pressure signals may have either a positive or negative polarity indicative of actuator operation, a positive polarity indicates operation in an extended position, a negative polarity indicates operation in a retracted position, said first and second decision logic units utilizing a comparison of differential pressure signal polarity to determine which actuator unit has failed and to send a shut-off signal to the failed actuator unit.

* * * * *